United States Patent
Olivier

(10) Patent No.: US 7,603,806 B2
(45) Date of Patent: Oct. 20, 2009

(54) FISH HOOK REMOVER

(76) Inventor: James J. Olivier, 80161 Red Hawk La., Bush, LA (US) 70431

( * ) Notice: Subject to any disclaimer, the term of this patent is extended or adjusted under 35 U.S.C. 154(b) by 572 days.

(21) Appl. No.: 11/456,783

(22) Filed: Jul. 11, 2006

(65) Prior Publication Data

US 2007/0011938 A1    Jan. 18, 2007

Related U.S. Application Data

(60) Provisional application No. 60/699,041, filed on Jul. 13, 2005.

(51) Int. Cl.
*A01K 97/18* (2006.01)
(52) U.S. Cl. .......................... 43/53.5; 43/54.1
(58) Field of Classification Search ............... 43/53.5, 43/54.1, 57.1, 57.2; 294/171, 19.1, 19.3, 294/26, 15, 17; 7/106; D22/149
See application file for complete search history.

(56) References Cited

U.S. PATENT DOCUMENTS

| | | | |
|---|---|---|---|
| 2,561,281 A * | 7/1951 | Lawrence | ............... 43/53.5 |
| 2,836,004 A | 5/1958 | Stader | |
| 3,154,879 A | 11/1964 | Crooke | |
| 4,014,130 A | 3/1977 | Roberts | |
| 4,882,871 A | 11/1989 | Marina | |
| 4,947,576 A | 8/1990 | Hull et al. | |
| 5,934,009 A | 8/1999 | Trahan | |
| 6,205,698 B1 | 3/2001 | Richards | |
| 6,272,788 B1 | 8/2001 | Bergacker | |
| 6,526,691 B1 | 3/2003 | Maddox | |
| 6,584,726 B2 | 7/2003 | Dehm | |

FOREIGN PATENT DOCUMENTS

JP        10295247 A  * 11/1998

OTHER PUBLICATIONS

Author Unknown; Bass Pro Shops; 2005 Angler's Catalog; pp. 253-255.

* cited by examiner

*Primary Examiner*—Michael R Mansen
*Assistant Examiner*—Joshua J. Michener
(74) *Attorney, Agent, or Firm*—McGlinchey Stafford, PLLC

(57) ABSTRACT

This invention provides a fish hook remover comprising a handle and a shaft. The handle comprises a first end, a second end, a width, and a longitudinal axis. The handle defines a handle notch and slot, the handle notch extending across the entire width of the handle, to define a width axis of the handle, and extending from the first end of the handle along a portion of the longitudinal axis of the handle, and terminating at a slot opening. The slot extends across the entire handle width and extends from the slot opening along a portion of the longitudinal axis and has a terminal portion offset from the longitudinal axis. The shaft comprises a first end, a second end, and a longitudinal axis. The first end defines a shaft notch. The second end is attached to the handle between the second end of the handle and the end of the slot distal from the first end of the handle, such that the longitudinal axis of the shaft is oriented substantially parallel to the width axis of the handle and substantially perpendicular to the longitudinal axis of the handle.

16 Claims, 3 Drawing Sheets

FISH HOOK REMOVER

REFERENCE TO RELATED APPLICATION

This Application claims the benefit of the priority of prior U.S. provisional Application No. 60/699,041, filed on Jul. 13, 2005, the disclosure of which application is incorporated herein by reference.

TECHNICAL FIELD

This invention relates to devices and methods for removing fish hooks from fish.

BACKGROUND

While fish hook removers are known in the art, some of them tend to eviscerate the fish in the process of removing the hook. Further, some of these devices require visual sighting of the fish hook in order to remove it from the fish, a disadvantage in darkness.

It would be desirable to have a fish hook remover that is effective at removing fish hooks while causing minimal damage, if any, to the fish itself. It would also be desirable if such a fish hook remover could assist in locating the fish hook without visual sighting of the hook.

SUMMARY OF THE INVENTION

The present invention provides devices and methods for removing fish hooks from the flesh of the fish without injury to the fish, i.e., without tearing the flesh of the fish, and can be used effectively even in darkness. Moreover, the fish hook remover of the present invention does not damage the fishing line or the lure, and can be used with hooks of all configurations (i.e., single hooks, double hooks, and tri-hooks). Further, the devices of the present invention can be operated with one hand. The advantages of the present invention are realized at least in part by the slot and hole in the handle of the fish hook remover, which help to guide the fishing line along the shaft of the fish hook remover.

One embodiment of the invention is a fish hook remover which comprises a handle and a shaft. The handle comprises a first end, a second end, a width, and a longitudinal axis; the handle defines at least a handle notch and slot. The handle notch extends across the entire width of the handle to define a width axis of the handle, and extends from the first end of the handle along only a portion of the longitudinal axis of the handle, and terminates at a slot opening. The slot extends across the entire handle width and extends from the slot opening along only a portion of the longitudinal axis of the handle and has a terminal portion offset from the longitudinal axis. The shaft comprises a first end, a second end, and a longitudinal axis. The first end of the shaft defines at least a shaft notch. The second end of the shaft is attached to the handle between the second end of the handle and the end of the slot distal from the first end of the handle, such that the longitudinal axis of the shaft is oriented substantially parallel to the width axis of the handle and substantially perpendicular to the longitudinal axis of the handle.

Another embodiment of the invention is a fish hook remover which comprises a handle and a shaft. The handle comprises a first end, a second end, a width, and a longitudinal axis; the handle defines at least a handle notch and slot. The handle notch extends across the entire width of the handle to define a width axis of the handle, and extends from the first end of the handle along only a portion of the longitudinal axis of the handle, and terminates at a slot opening. The slot extends across the entire handle width and extends from the slot opening along only a portion of the longitudinal axis of the handle and has a terminal portion offset from the longitudinal axis. The terminal portion of the slot is sized to accommodate a roller. A roller is present in the terminal portion of the slot, and the roller has an axle about which the roller rotates. The axle is attached to the handle and is oriented substantially perpendicular to the longitudinal axis and substantially perpendicular to the width axis. The shaft comprises a first end, a second end, and a longitudinal axis. The first end of the shaft defines at least a notch. The second end of the shaft is attached to the handle between the second end of the handle and the end of the slot distal from the first end of the handle, such that the longitudinal axis of the shaft is oriented substantially parallel to the width axis of the handle and substantially perpendicular to the longitudinal axis of the handle.

Figure 1:
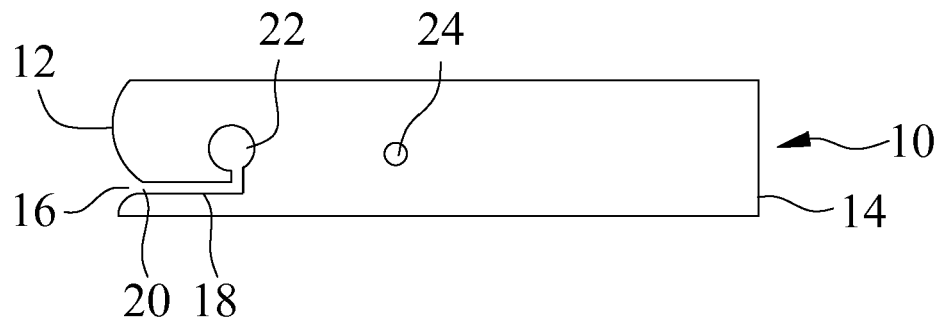
FIG. 1 is a view of a fish hook remover of the invention, looking along the shaft at the handle.

These and other features of this invention will be still further apparent from the ensuing description, drawings, and appended claims.

FURTHER DETAILED DESCRIPTION OF THE INVENTION

The handle of the fish hook remover has a surface, a first end, a width, and a longitudinal axis. The handle may be solid or the handle can be enclosed (hollow or partially hollow). Preferably, the handle is solid, and is preferably constructed of or at least contains a material that allows it to float. Such materials include wood, such as oak and balsa, or plastic. When the handle is hollow or partially hollow, air in the handle can provide buoyancy. A hollow or partially hollow handle should be constructed from a material which gives the handle enough physical strength that it can be used to remove fish hooks without damage to or breakage of the handle.

That the handle has a width and a longitudinal axis means that the handle is longer in one direction than in other directions.

The handle defines a handle notch and slot. The handle notch extends across the entire width of the handle to define a width axis of the handle, and extends from the first end of the handle along only a portion of the longitudinal axis of the handle, and terminates at a slot opening. The handle notch helps to guide the fishing line into the slot through the slot opening. The slot extends across the entire handle width and extends from the slot opening along only a portion of the longitudinal axis of the handle and has a terminal portion offset from the longitudinal axis. The terminal portion of the slot is preferably wider than the slot between the slot opening and the terminal portion of the slot. After entering the slot through the slot opening, the fishing line is guided through the slot along the longitudinal axis of the handle into the terminal portion of the slot. Once guided into the terminal portion, the fishing line remains there, especially when the terminal portion of the slot is wider. Thus, the handle notch and slot act as a trap for the fishing line.

The shaft is preferably solid, and also preferably is round. Preferred shafts are metal. More preferred are shaft that are solid and metal. Particularly preferred are shafts which are round, solid, and metal.

The shaft has a first end and a second end. The first end of the shaft has a notch. The notch at the first end of the shaft may be V-shaped, U-shaped, or have a shape intermediate to being V-shaped and U-shaped. U-shaped notches are preferred because it has been found that they perform better in windy conditions than do V-shaped notches. In addition, the fish hook has a tendency to become stuck in the "V" of a V-shaped notch. The ends of the notch on the shaft are preferably rounded rather than pointed, which minimizes damage to the fish (as well as to the fishing line, the lure, and those who come into contact with the fish hook remover).

The second end of the shaft is attached to the handle between the second end of the handle and the end of the slot distal from the first end of the handle, such that the longitudinal axis of the shaft is oriented substantially parallel to the width axis of the handle. Here, the term "substantially parallel" means that the longitudinal axis of the shaft is at an angle of $45° \leqq 0° \geqq 45°$ relative to the width axis of the handle. Preferably, the longitudinal axis of the shaft is nearly parallel or exactly parallel to the width axis of the handle, where "nearly parallel" means within about 5° of exactly parallel.

The longitudinal axis of the shaft is substantially perpendicular to the longitudinal axis of the handle, which makes the handle and the shaft substantially perpendicular to each other. Here, the term "substantially perpendicular" means that the longitudinal axis of shaft is at an angle of $45° \leqq 90° \geqq 45°$, relative to the longitudinal axis of the handle. Preferably, the longitudinal axis of the shaft is nearly perpendicular or exactly perpendicular to the longitudinal axis of the handle, where "nearly perpendicular" means within about 5° of exactly perpendicular.

In the fish hook remover having a roller, the terminal portion of the slot is sized to accommodate a roller. Preferably, the terminal portion is closed at one end of the width axis; i.e., the terminal portion of the slot is open on one end of the width axis and closed at the other end. When the terminal portion of the slot is closed at one end of the width axis, the second end of the shaft is preferably attached to the handle such that the longitudinal axis of the shaft is co-lateral with the closed end of the slot opening. Here, the term "co-lateral" is used to mean "on the same side." Thus, the longitudinal axis of the shaft (and ultimately the second end of the shaft) is on the same side of the handle as the closed end of the width axis.

The roller is preferably round or cylindrical in shape. Other shapes for the roller are possible so long as the shape of the roller does not impede the roller's ability to rotate around the axle. A preferred type of roller is a wheel. The roller may protrude out of the terminal portion of the slot and thus out of the handle. The roller should be made out of a material that "grips" the fishing line. Suitable materials include plastics and rubber; rubber is a preferred material for the roller. To assist in gripping the fishing line, the surface of the roller is textured. The texture may be in any of a variety of patterns, including straight ribs or striations, rippled ribs, nubs, and the like, as long as the texture has parts that are raised relative to other parts of the surface of the roller. Greater amounts of texture (e.g., more ribs per unit area) provide better "grip" of the fishing line, and thus more texture is preferred.

Various mechanisms can be used to make the fishing line taut. The line may be made taut manually (e.g., by pulling on the fishing line by hand). Another way is to use the fishing rod to make the fishing line taut. In fish hook removers possessing a roller, tautness of the fishing line can be achieved by rotating the roller in the appropriate direction. When the length of the fishing line is long, mechanical mechanisms for tautening the fishing line are desirable. Such mechanical mechanisms can be incorporated into a fish hook remover of this invention, and fish hook removers incorporating such mechanical mechanisms constitute embodiments of this invention. An example of a mechanical mechanism for tautening the fishing line includes a roller having a sawtooth gear that is pushed with a lever to rotate the roller. After the fish hook has been removed from the fish, these mechanisms for tautening the line can be used in reverse for loosening the fishing line.

The fish hook remover of the invention can be manufactured in different sizes, as smaller and larger sizes are more suited, respectively, to smaller and larger fish. Another possibility is to make a handle which may be used interchangeably with different shafts, each of which assembled fish hook removers is an embodiment of this invention.

Still another possibility for achieving different sizes is to have a shaft which can be lengthened or shortened, for example by having a shaft in two or more sections (pieces). When the shaft is in two sections, the separation of the sections may occur at any convenient point between the first end (which has the notch) and the second end (which attaches to the handle). The sections of the shaft may be connected by either a screw-on or a snap-on mechanism; a screw-on mechanism is preferred.

Other suitable variations of the fish hook remover can be made. One example of such a variation is a remover wherein the shaft can be folded parallel to the handle when the device is not in use. A further variation is a shaft which is magnetic at the notched end. A particularly desirable variation, especially in poor lighting conditions, is the presence of a light on the handle near the shaft. The fish hook removers of the present invention can locate the fish hook without visual sighting of the hook; however, it takes time and effort. The presence of a light on the handle near the shaft allows the finding of the hook to take less effort, and the hook can be located faster. Two or more of these variations may be used in combination in the same fish hook remover.

When the fish hook remover has a light, the switch for turning the light on and off is preferably on the second end of the handle. It is also preferred that a battery for the light is housed in the handle near the second end of the handle. A preferable position for the light (the bulb portion) is near the terminal portion of the slot, oriented in the direction of along the shaft's longitudinal axis, toward the first end of the shaft.

The fish hook removers of the invention are used by grasping the handle, guiding the fishing line into the notch, threading the fishing line into the slot and moving the fishing line to the terminal portion of the slot, and sliding the shaft along the fishing line until the notch reaches the hook. Once the hook is in the notch, the user's thumb and index finger are used to hold the fishing line taut while applying pressure in a forward direction to remove the fish hook; the index finger pins the fishing line to the shaft. The fish hook remover is then brought out of the fish along with the fish hook. In the fish hook removers having a roller, the fishing line is guided through the handle notch and slot onto the roller. The roller is rotated to tauten the fishing line.

The Figures represent preferred embodiments, and are not intended to be construed as limiting the invention.

Referring now to the Figures, FIG. 1 is a view of a fish hook remover of the invention, looking along the shaft at the handle. The handle 10 is perpendicular to the shaft 24, and the handle has a first end 12 and a second end 14. The shaft 24 projects out of the paper toward the viewer. The handle notch 16 guides the fishing line into the slot opening 20. The slot 18 is offset from the longitudinal axis (which is in the plane of the paper), and thus better traps the fishing line in the hole. The width axis of the handle 10 is perpendicular to the plane of the paper. The terminal portion of the slot 22 is wider than the rest of the slot 18.

Figure 2:
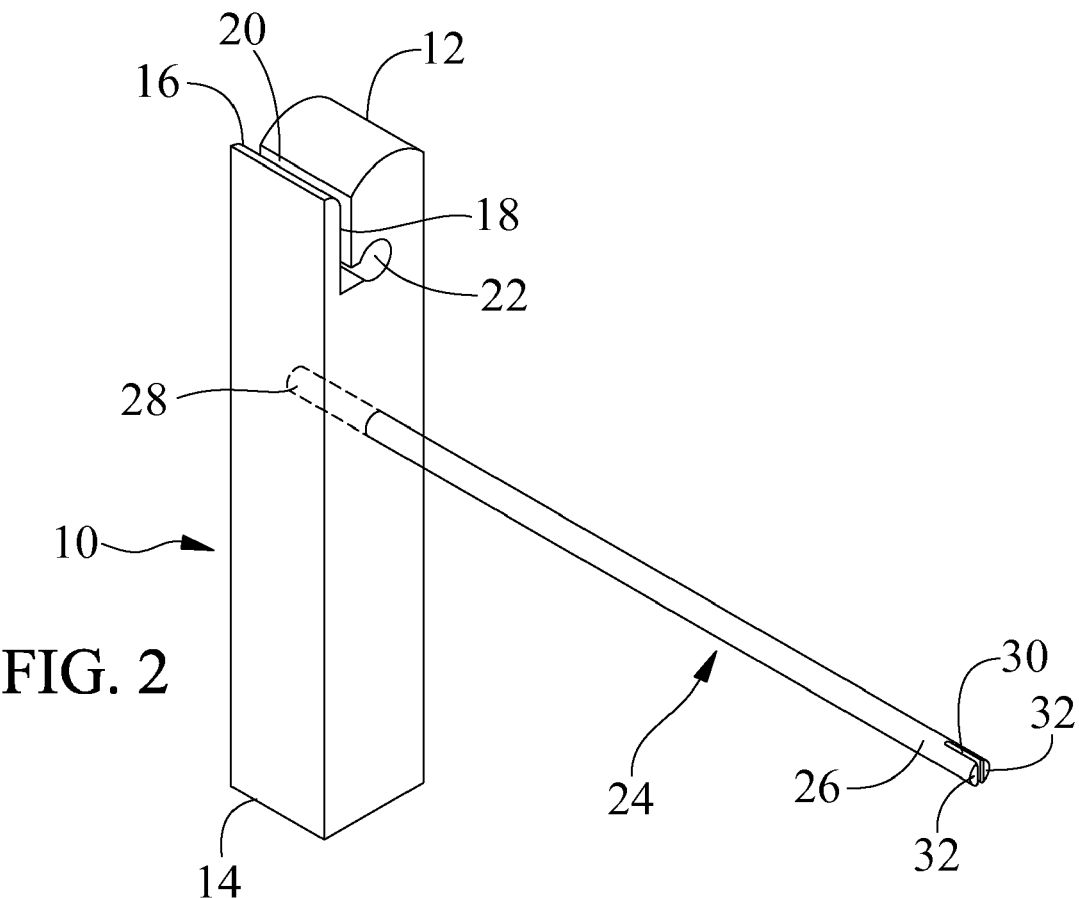
FIG. 2 is a fish hook remover of the invention, viewed from the side at a slightly rotated angle.

FIG. 2 is a fish hook remover of the invention, viewed from the side at a slightly rotated angle. The handle 10 having a first end 12 and a second end 14 is shown. The handle notch 16 guides the fishing line into the slot opening 20 and through the slot 18. The terminal portion of the slot 22 is offset from the longitudinal axis (which is in the plane of the paper); the terminal portion of the slot 22 is wider than the rest of the slot 18. The width axis of the handle 10 is perpendicular to the plane of the paper. The shaft 24 is perpendicular to the handle 10, and has a first end 26 and a second end 28. The second end 28 of the shaft 24 is embedded in the handle 10. The ends 32 of the U-shaped shaft notch 30 are rounded.

Figure 3:
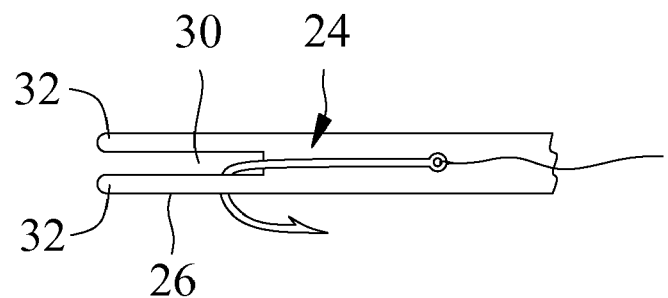
FIG. 3 is a view of a U-shaped notch at the first end of a shaft.

FIG. 3 is a view of a U-shaped shaft notch shown with a fish hook in the notch. The first end 26 of the shaft 24 is shown, with a shaft notch 30 that is U-shaped. The ends 32 of the notch 30 are rounded, which is preferred.

Figure 4:
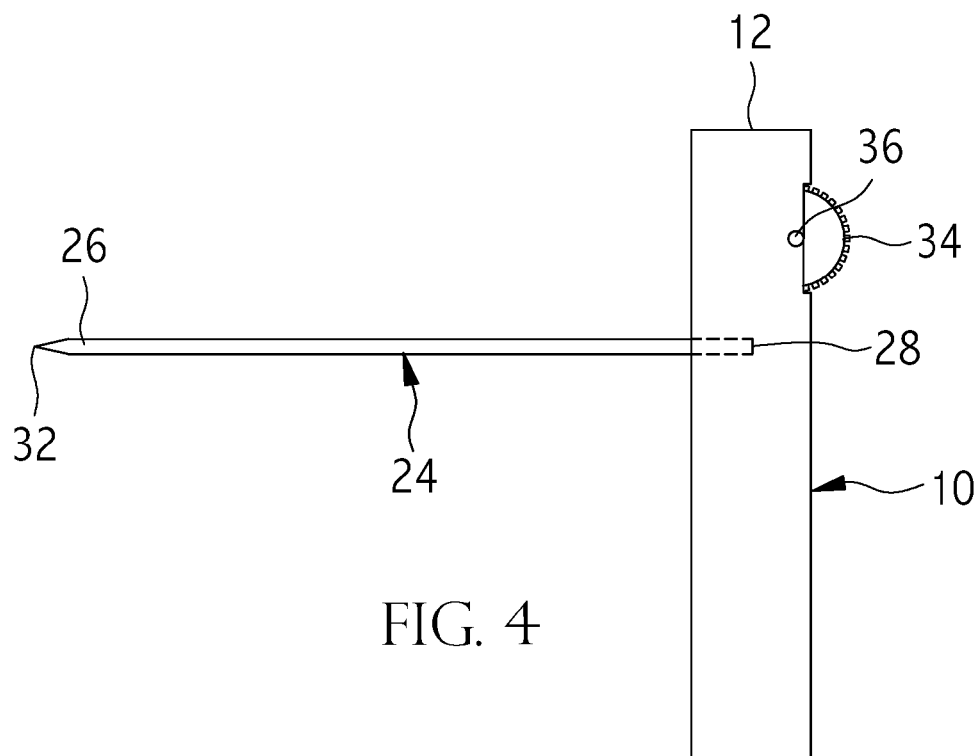
FIG. 4 is a side view of a fish hook remover which has a roller.

FIG. 4 is a side view of a fish hook remover which has a roller. The handle 10 is perpendicular to the shaft 24. The handle 10 has a first end 12 and a second end 14. The width axis and the slot along a portion of the longitudinal axis of the handle are in the plane of the paper. The longitudinal axis of the handle 10 is also in the plane of the paper. At the first end 26 of the shaft 24, the shaft notch 30 has ends 32 which are pointed. The roller 34 protrudes out of the handle 10. The surface of the roller 34 is ribbed. Also shown is the axle 36 for the roller 34.

Figure 5:
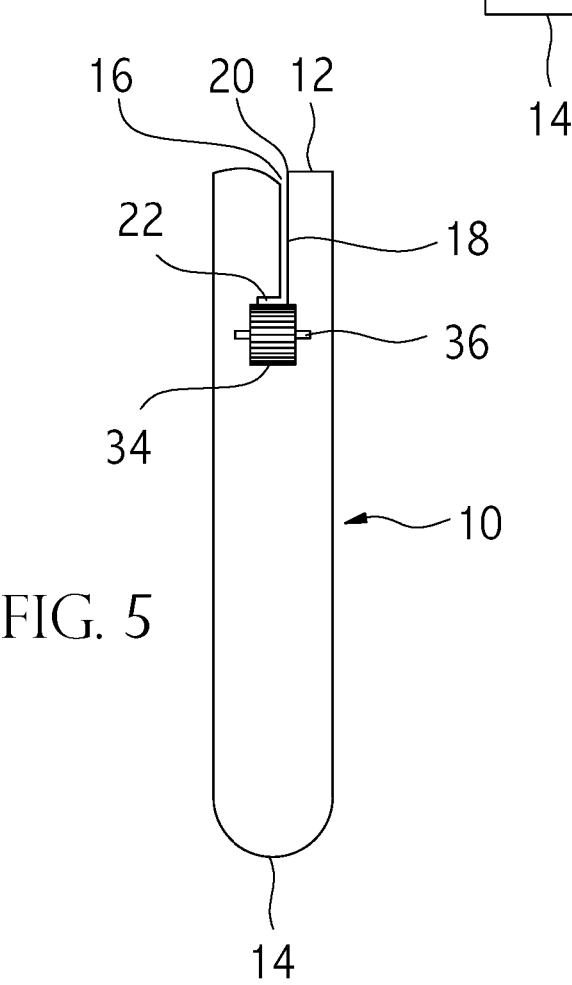
FIG. 5 is a view of a fish hook remover which has a roller, seen from above the roller.

FIG. 5 is a view of a fish hook remover which has a roller, as seen from above the roller. The handle 10 is perpendicular to the shaft (not seen), and the shaft projects out of the paper away the viewer. The handle has a first end 12 and a second end 14. The handle notch 16, which guides the fishing line to the slot opening 20, is shown. The visible part of the slot 18 is along the longitudinal axis, which longitudinal axis is perpendicular to the plane of the paper. The width axis is also perpendicular to the plane of the paper. The terminal portion of the slot 22 is partially hidden from view by the roller 34. The surface of the roller 34 is ribbed. The axle 36 for the roller 34 is shown.

Figure 6:
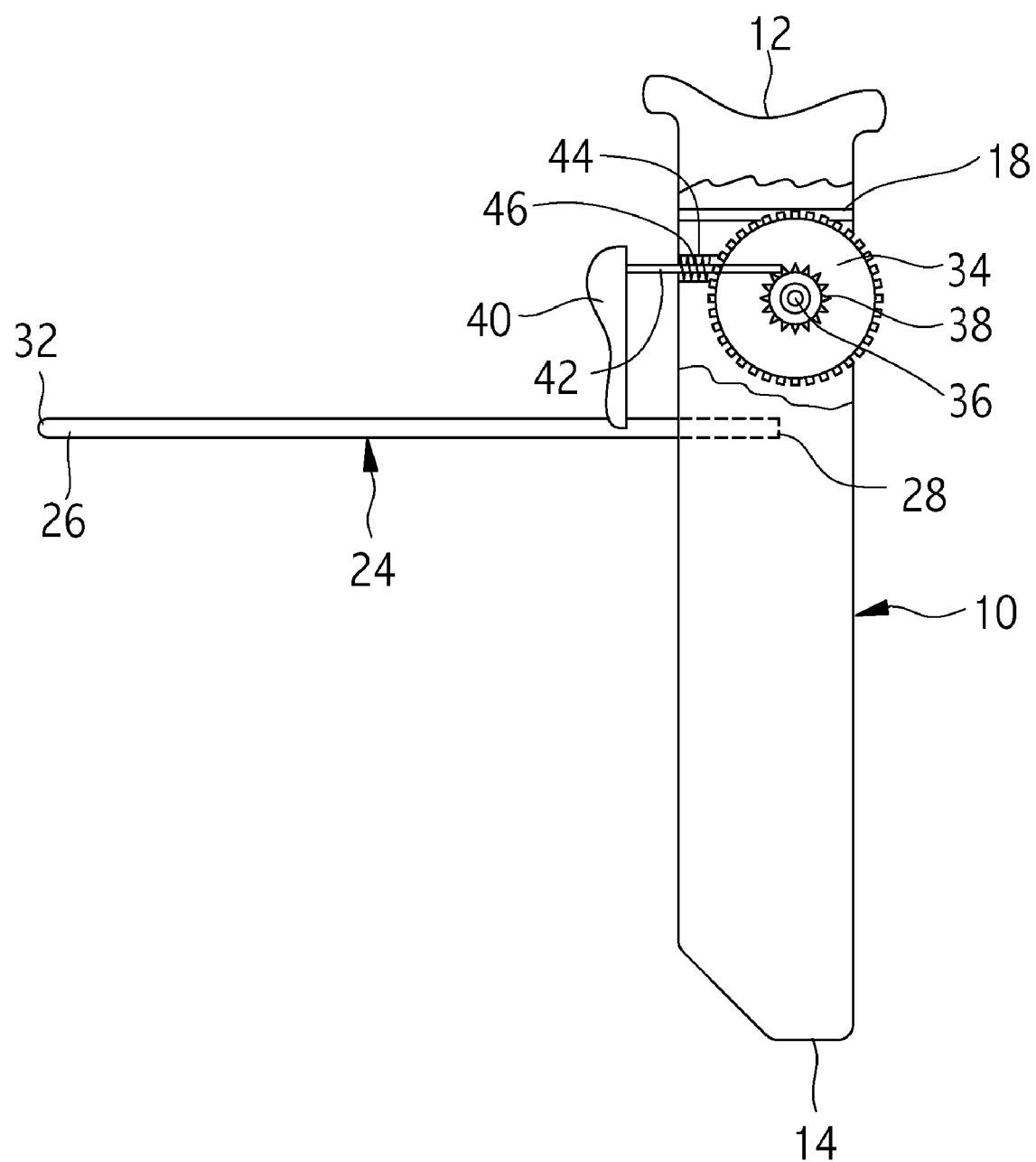
FIG. 6 is a side view of a fish hook remover which has a roller, showing a cutaway view of the slot, the roller, and the mechanism for mechanically advancing the roller.

FIG. 6 is a side view of a fish hook remover which has a roller, showing a cutaway view of the slot, the roller, and the mechanism for mechanically advancing the roller. The handle 10 is perpendicular to the shaft 24. The handle 10 has a first end 12 and a second end 14. Both the width axis and the longitudinal axis of the handle 10 are in the plane of the paper. At the first end 26 of the shaft 24, the shaft notch 30 has ends 32 which are rounded. The second end 28 of the shaft 24 extends into is embedded in the handle 10. The roller 34 protrudes out of the handle 10. The surface of the roller 34 is ribbed. In the cutaway view, a portion of the slot 18 is shown extending across the width of the handle 10. The axle 36 for the roller 34 projects into the paper away from the viewer. A sawtooth gear 38 is on the roller 34. A first lever 40 is attached to the shaft 24, and the first lever 40 is connected to a second lever 42, which is able to contact the sawtooth gear 38 when the first lever 40 is moved closer to the handle 10, and thus to mechanically advance the roller 34 to make fishing line taut. Also shown is a chamber 44 in the handle 10 for holding a spring 46, which spring 46 is in contact with the second lever 42.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent, patent application and printed publication referred to above is incorporated herein by reference in toto to the fullest extent permitted as a matter of law.

This invention is susceptible to considerable variation in its practice. Therefore, the foregoing description is not intended to limit, and should not be construed as limiting, the invention to the particular exemplifications presented hereinabove.

The invention claimed is:

1. A fish hook remover which comprises:
   (i) a handle comprising a first end, a second end, a width, and a length extending along a longitudinal axis, wherein the first end defines at least a handle notch and slot, the handle notch extending across the entire width of the handle to define a width axis of the handle, and extending from the first end of the handle along only a portion of the length along the longitudinal axis of the handle, and terminating at a slot opening, the slot extending across the entire handle width and extending from the slot opening along only a portion of the longitudinal axis of the handle and having a terminal portion offset from a longitudinal axis of the slot, which terminal portion is sized to accommodate a roller, wherein a roller is present in the terminal portion, the roller having an axle about which the roller rotates, which axle is attached to the handle and is oriented substantially perpendicular to the longitudinal axis and substantially perpendicular to the width axis; and
   (ii) a shaft comprising a first end, a second end, and a longitudinal axis, wherein the first end defines at least a shaft notch, and wherein the second end is attached to the handle between the second end of the handle and the end of the slot distal from the first end of the handle, such that the longitudinal axis of the shaft is oriented substantially parallel to the width axis of the handle and substantially perpendicular to the longitudinal axis of the handle.

2. A fish hook remover as in claim 1 wherein the handle is solid.

3. A fish hook remover as in claim 1 which has at least one of the following characteristics:
   A) the notch is U-shaped;
   B) the shaft notch has ends which are rounded;
   C) the shaft is solid;
   D) the shaft is metal;
   E) the shaft is round.

4. A fish hook remover as in claim 1 which has at least one of the following characteristics:
   I) the longitudinal axis of the shaft is nearly parallel or exactly parallel to the width axis of the handle;
   II) the longitudinal axis of the shaft is nearly perpendicular or exactly perpendicular to the longitudinal axis of the handle.

5. A fish hook remover as in claim 1 wherein the handle is solid, wherein the notch is U-shaped, wherein the shaft notch has ends which are rounded, wherein the shaft is solid, wherein the shaft is metal, wherein the longitudinal axis of the shaft is nearly parallel or exactly parallel to the width axis of the handle, and wherein the longitudinal axis of the shaft is nearly perpendicular or exactly perpendicular to the longitudinal axis of the handle.

6. A fish hook remover as in claim 1 which has at least one of the following characteristics:
   a) the terminal portion of the slot is closed at one end of the width axis;
   b) the roller protrudes out of the terminal portion of the slot;
   c) the roller is round or cylindrical in shape;
   d) the roller is a wheel.

7. A fish hook remover as in claim 1 wherein the terminal portion of the slot is closed at one end of the width axis, and wherein the second end of the shaft is attached to the handle such that the longitudinal axis of the shaft is co-lateral with the closed end of the slot opening.

8. A fish hook remover as in claim 1 wherein the roller protrudes out of the terminal portion of the slot and/or the roller is round or cylindrical in shape, and wherein the roller is a wheel.

9. A fish hook remover as in claim 1 wherein the roller is round or cylindrical in shape and/or the roller is a wheel, and which fish hook remover has a mechanical mechanism for tautening fishing line.

10. A fish hook remover as in claim 9 wherein the mechanical mechanism is a sawtooth gear on the roller, which sawtooth gear is pushed with a lever to rotate the roller.

11. A fish hook remover as in claim 6 wherein the handle is solid, wherein the notch is U-shaped, wherein the shaft notch has ends which are rounded, wherein the shaft is solid, wherein the shaft is metal, wherein the longitudinal axis of the shaft is nearly parallel or exactly parallel to the width axis of the handle, and wherein the longitudinal axis of the shaft is nearly perpendicular or exactly perpendicular to the longitudinal axis of the handle.

12. A fish hook remover as in claim 11 which has at least one of the following characteristics:
   the shaft is round;
   the roller protrudes out of the terminal portion of the slot;
   the roller is a wheel.

13. A fish hook remover as in claim 1 wherein the roller is a wheel, and which fish hook remover has a mechanical mechanism for tautening fishing line.

14. A fish hook remover as in claim 13 wherein the mechanical mechanism is a sawtooth gear on the roller, which sawtooth gear is pushed with a lever to rotate the roller.

15. A fish hook remover as claim 1 which has at least one of the following:
   (a) a light on the handle near the shaft;
   (b) the shaft is magnetic at the notched end;
   (c) the shaft can be folded parallel to the handle.

16. A fish hook remover as in claim 15 which has at least a light on the handle near the shaft.

* * * * *